US008560971B2

(12) United States Patent  
Duquene et al.

(10) Patent No.: US 8,560,971 B2  
(45) Date of Patent: Oct. 15, 2013

(54) MANAGEMENT OF SELECTED AND NONSELECTED ITEMS IN A LIST

(75) Inventors: Joel Duquene, Raleigh, NC (US); Morris Stanley Johnson, Jr., Cary, NC (US); Henri F. Meli, Cary, NC (US); Karline Vilme, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 12/838,968

(22) Filed: Jul. 19, 2010

(65) Prior Publication Data

US 2012/0017175 A1   Jan. 19, 2012

(51) Int. Cl.
*G06F 3/048* (2013.01)
*G06F 12/00* (2006.01)

(52) U.S. Cl.
USPC ........... 715/853; 415/823; 415/841; 415/854; 707/828; 707/829

(58) Field of Classification Search
USPC .................. 715/823, 853, 854; 707/828, 829
See application file for complete search history.

(56) References Cited

U.S. PATENT DOCUMENTS 6,205,453 B1 * 3/2001 Tucker et al. ................. 715/202
2006/0235817 A1 * 10/2006 Wong et al. ........................ 707/1
2006/0294599 A1   12/2006 Sim et al.
2007/0124271 A1 * 5/2007 Bauchot et al. ................... 707/1
2007/0150485 A1   6/2007 Uittenbogaard
2007/0168875 A1 * 7/2007 Kowitz et al. ................. 715/764

OTHER PUBLICATIONS

Introduction to Microsoft Access (published in 2008 by Yahoo) http://www.techrepublic.com/blog/five-apps/five-tips-for-working-efficiently-in-the-access-navigation-pane/242.*

* cited by examiner

*Primary Examiner* — Boris Pesin
*Assistant Examiner* — Rinna Yi
(74) *Attorney, Agent, or Firm* — DeLizio Gilliam, PLLC (57) ABSTRACT

A method includes, in response to items being selected in a graphical user interface, defining a first state for the items as selected items and a second state for a set of one or more unselected items in the list as unselected. The method includes graphically indicating via the graphical user interface the items as selected items and the set of items as unselected items. The method includes updating the first state of the items to a third state that reflects manipulation of the items while still indicating the items as selected items and maintaining the second state for the set of items. The method includes updating the graphical user interface to depict the manipulation of the items in accordance with the command while still indicating the items as selected items and the set of items as unselected items.

14 Claims, 8 Drawing Sheets

| Folders | Name | Size | Type | Date Modified |
|---|---|---|---|---|
| Folder A | alpha 40 | 1111KB | File Folder | 08/05/2004 7:43 PM |
| beta1 | alpha2 | 105KB | File Folder | 04/15/2009 2:45 PM |
| beta2 | alpha 33 | 1112KB | File Folder | 07/12/2009 12:44 PM |
| beta3 | alpha 31 | 1106KB | File Folder | 08/11/2009 3:27 PM |
| beta4 | alpha 20 | 400KB | Word Processing Document | 11/15/2009 10:45AM |
| beta5 | alpha 5 | 2100KB | File Folder | 12/10/2009 1:47 PM |
| beta6 | alpha 22 | 1106KB | Spreadsheet Document | 01/12/2010 2:45 PM |
| beta7 | alpha 21 | 9506KB | File Folder | 01/12/2010 4:47 PM |
| beta8 | alpha 7 | 1509KB | Word Processing Document | 02/09/2010 2:43 PM |
| beta9 | alpha 8 | 145KB | Word Processing Document | 02/09/2010 2:47 PM |
| beta20 | alpha 36 | 1106KB | File Folder | 02/21/2010 1:07 PM |
| beta21 | alpha 9 | 1115KB | Spreadsheet Document | 03/01/2010 3:01 PM |
| beta22 | alpha3 | 1200KB | File Folder | 03/11/2010 1:47 PM |
| beta30 | alpha 35 | 1201KB | File Folder | 03/12/2010 12:25 PM |
| beta31 | alpha 34 | 110KB | Word Processing Document | 04/11/2010 1:22 PM |
| beta32 | alpha4 | 1502KB | File Folder | 04/12/2010 2:45 AM |
| beta33 | alpha1 | 1106KB | File Folder | 04/12/2010 2:47 PM |
| beta34 | alpha6 | 5005KB | File Folder | 04/12/2010 10:20PM |
| beta35 | alpha 30 | 105KB | Word Processing Document | 04/30/2010 2:46 PM |
| beta36 | alpha 32 | 15023B | File Folder | 05/12/2010 10:47 PM |
| beta37 | alpha 38 | 1006KB | File Folder | 05/12/2010 11:43 PM |

MANAGEMENT OF SELECTED AND NONSELECTED ITEMS IN A LIST

BACKGROUND

Embodiments of the inventive subject matter generally relate to the field of data processing, and, more particularly, to management of selected and nonselected items in a list of a graphical user interface (GUI).

A number of different applications present to a user a list of items that can that can be sorted in different orders. For example, various computer applications (e.g., a word processing application, a spreadsheet application, various file management applications, etc.) can provide a graphical user interface (GUI) for locating folders and files stored on machine-readable media of the computer. These applications can present a list of folders and files in a hierarchical structure that can be sorted according to name, date of creation, size, data of last modification, etc.

SUMMARY

Some example embodiments include a method that includes, in response to a plurality of items being selected in a graphical user interface, defining a first state for the plurality of items as selected items and a second state for a set of one or more unselected items in the list as unselected. The method includes graphically indicating via the graphical user interface the plurality of items as selected items and the set of items as unselected items. The method also includes, responsive to a command for manipulating the plurality of items indicated via the graphical user interface, updating the first state of the plurality of items to a third state that reflects manipulation of the plurality of items in accordance with the command while still indicating the plurality of items as selected items and maintaining the second state for the set of items. Also responsive to the command for manipulating the plurality of items indicated via the graphical user interface, the method includes updating the graphical user interface to depict the manipulation of the plurality of items in accordance with the command while still indicating the plurality of items as selected items and the set of items as unselected items.

Some example embodiments include a computer program product for managing items in a list. The computer program product includes a computer readable storage medium having computer readable program code embodied therewith. The computer readable program code is configured to present items in a list of a graphical user interface in a first order. The first order includes at least one of alphabetical, size and date modified. The computer readable program code is configured to receive a selection of one or more of the items in the list, wherein the items in the list have a viewability definition. The viewability definition defines whether the items in the list are visible or hidden in the graphical user interface in the first order. In response to a determination that the selection creates at least one group of contiguous nonselected items, the computer readable program code is configured to add a nonselected group marker in the graphical user interface for the at least one group of contiguous nonselected items, The selection of the selected group marker toggles the viewability definition between visible and hidden for the at least one group of contiguous nonselected items. The computer readable program code is configured to receive a request to reorder the items in the list in a second order that is different from the first order. The second order includes at least one of alphabetical, size and date modified. The computer readable program code is configured to present the items in the list in the second order, wherein the items in the list retain their viewability definition from the graphical user interface in the first order during presentation of the items in the list in the second order.

Some example embodiments include an apparatus that has a processor. The apparatus also includes an item management module executable on the processor. The item management module is operable to present items in a list of a graphical user interface in a first order on a display. The item management module is operable to receive a selection of one or more of the items in the list, wherein the items in the list have a viewability definition. The viewability definition defines whether the items in the list are visible or hidden in the graphical user interface in the first order. The item management module is operable to define the items in the list as selected or nonselected based on the selection of the one or more items in the list. The item management module is operable to receive a request to reorder the items in the list in a second order that is different from the first order. The item management module is operable to present the items in the list in the second order on the display, wherein the items in the list retain their viewability definition from the graphical user interface in the first order during the presenting of the items in the list in the second order.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, some examples are described herein using a list of files and folders stored in machine-readable media of a computer. However, embodiments are so limited and are applicable in any application having a list of items. In other instances, well-known instruction instances, protocols, structures, and techniques have not been shown in detail in order not to obfuscate the description.

In some example embodiments, a user of a computer application can be presented with a list of files and folders. The user can sort the files and folders according to different orders (e.g., name, date of creation, size, last date of modification, etc.). The graphical user interface can comprise a file navigation tool. Some example embodiments can be particularly useful for list of items that are very large. Specifically, a large list can be across multiple pages for viewing on the display, thereby requiring scrolling across the multiple pages. Also, if the user needs to display the items in the list in different orders, it can be difficult to keep track of the selected items. For example, a user can display the items in a list in alphabetical order according to the names of the files and folders. The user can then select a number of items from that list. The user can then rearrange the same items according to a different order (e.g., last date of modification). In some example embodiments, the selection (which can be shown as a highlight) remains even after the items are reordered. Some example embodiments enable a user to hide or show some or all of the selected or nonselected items. Such example embodiments, therefore, provide an efficient and fast way for the selected and nonselected items to be viewed together. Also, these example embodiments enable a user to locate and process desired selected or nonselected items.

Some example embodiments allow the selections to remain locked even as the order of such items change. In particular, items (both selected and nonselected) can have an associated state. A state can include an item's viewability definition. Also, for a contiguous group, the state can include the order of the items. The viewability definition defines whether an item or groups of items in a list are visible or hidden in the graphical user interface. In some example embodiments, the viewability definition for the items is the same even as the order is changed. For example, if an item is hidden when the list is in alphabetical order, the item remains hidden when the list is changed to a different order (e.g., according to size). Also, after a user reorders the items in the list, the selected and nonselected items can be regrouped relative to the different ordering of the items in the list. Accordingly, the selected and nonselected items can be quickly located, regardless of the ordering of the items in the list.

In some example embodiments, items in a given group (i.e., contiguous group (selected or nonselected)) have a same state (e.g., viewability definition). Also, the state of each contiguous group and each noncontiguous item can be independent of each other. For example, the viewability definition of a first contiguous group of selected items can be different than the viewability definition of a second contiguous group of selected items. In another example, the order of a first contiguous group of nonselected items can be different than the order of a second contiguous group of nonselected items.

Therefore, some example embodiments provide an efficient and fast way to locate selected and nonselected items that are not in view, regardless of how the items are ordered. Also, some example embodiments enable selected and nonselected items to be easily accessible, even after changing the display order of the items. Therefore, a user can work on a subset of the selected items or a selected item without losing the selection of the other selected items. In some example embodiments, buttons are provided in the graphical user interface, wherein selection of these buttons expands or collapses all of the selected or all of the nonselected items in the list, in accordance with some example embodiments. Accordingly, a user can quickly view different categories of items in the list even as the ordering of the items changes.

Figure 1:
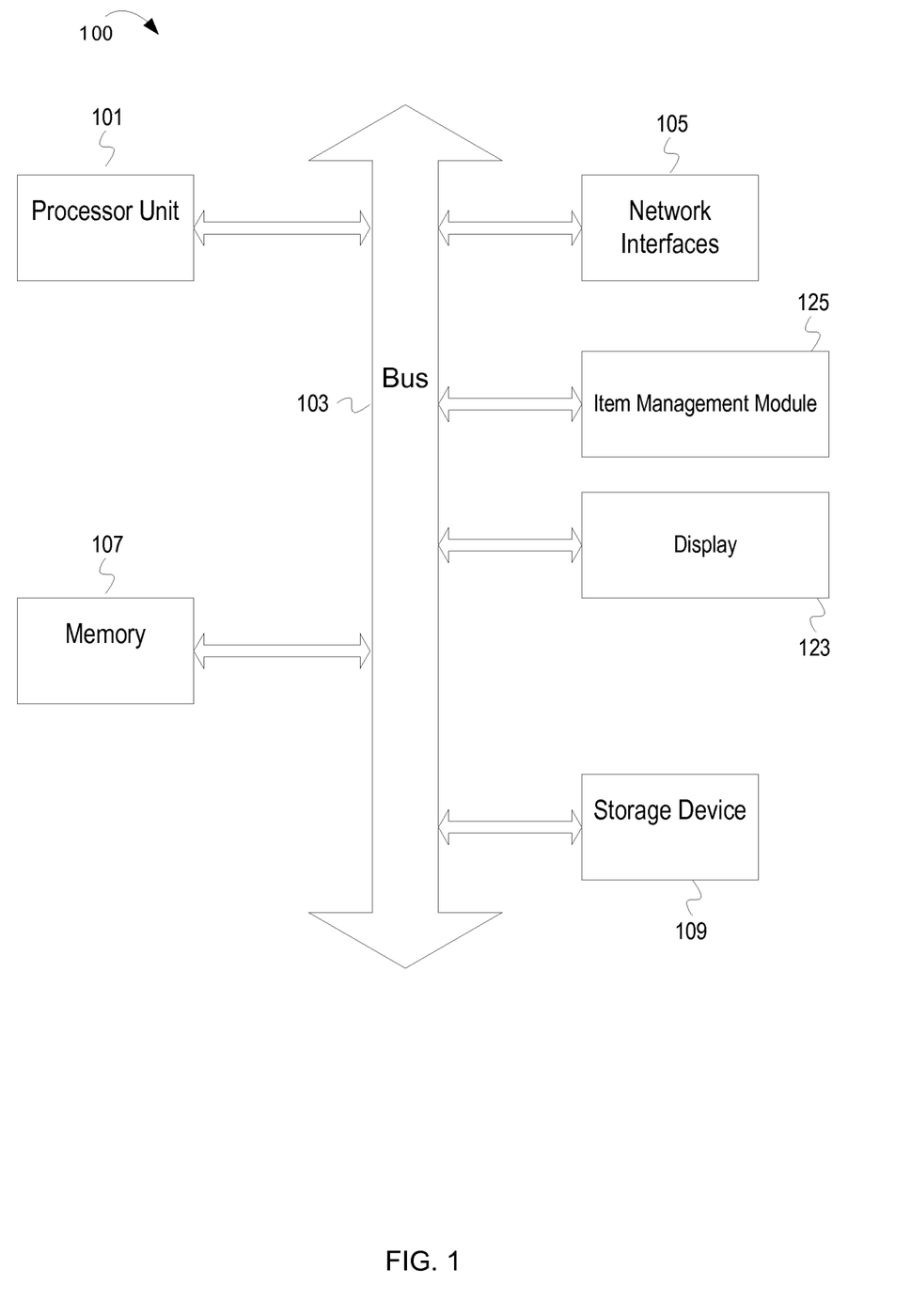
FIG. 1 is a block diagram illustrating a computer system, according to some example embodiments.

FIG. 1 is a block diagram illustrating a computer system, according to some example embodiments. A computer system 100 includes a processor unit 101 (possibly including multiple processors, multiple cores, multiple nodes, and/or implementing multi-threading, etc.). The computer system 100 includes memory 107. The memory 107 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the below described possible realizations of machine-readable media. The computer system 100 also includes a bus 103 (e.g., PCI, ISA, PCI-Express, HyperTransport®, InfiniBand®, NuBus, etc.), a network interface 105 (e.g., an ATM interface, an Ethernet interface, a Frame Relay interface, SONET interface, wireless interface, etc.), and a storage device(s) 109 (e.g., optical storage, magnetic storage, etc.).

The computer system 100 also includes an item management module 125. The item management module 125 can provide management the items in a list, as further described below. For example, the item management module 125 can display items in a list. The item management module 125 can also process changes in the items. For example, the item management module 125 can process input to select one or more items in the list, can process inputs to hide or make visible selected and nonselected items in the list, can modify the display based on these inputs, etc. Any one of these functionalities may be partially (or entirely) implemented in hardware and/or on the processing unit 101. For example, the functionality may be implemented with an application specific integrated circuit, in logic implemented in the processing unit 101, in a co-processor on a peripheral device or card, etc.

The computer system 100 includes a display 123. The items in a list can be displayed on the display 123. For example, the item management module 125 can display the items in a list in a graphical user interface on the display 123. Also, the items in the list can be used in a number of different applications (word processing applications, spreadsheet applications, file management applications, etc.). For example, a file management application can display files and folders stored in machine-readable media of a computer. Further, realizations may include fewer or additional components not illustrated in FIG. 1 (e.g., video cards, audio cards, additional network interfaces, peripheral devices, etc.). The processor unit 101, the storage device(s) 109, the network interface 105, the memory 107, the display 123 and the item management module 125 are coupled to the bus 103. Although illustrated as being coupled to the bus 103, the memory 107 may be coupled to the processor unit 101.

Figure 2:
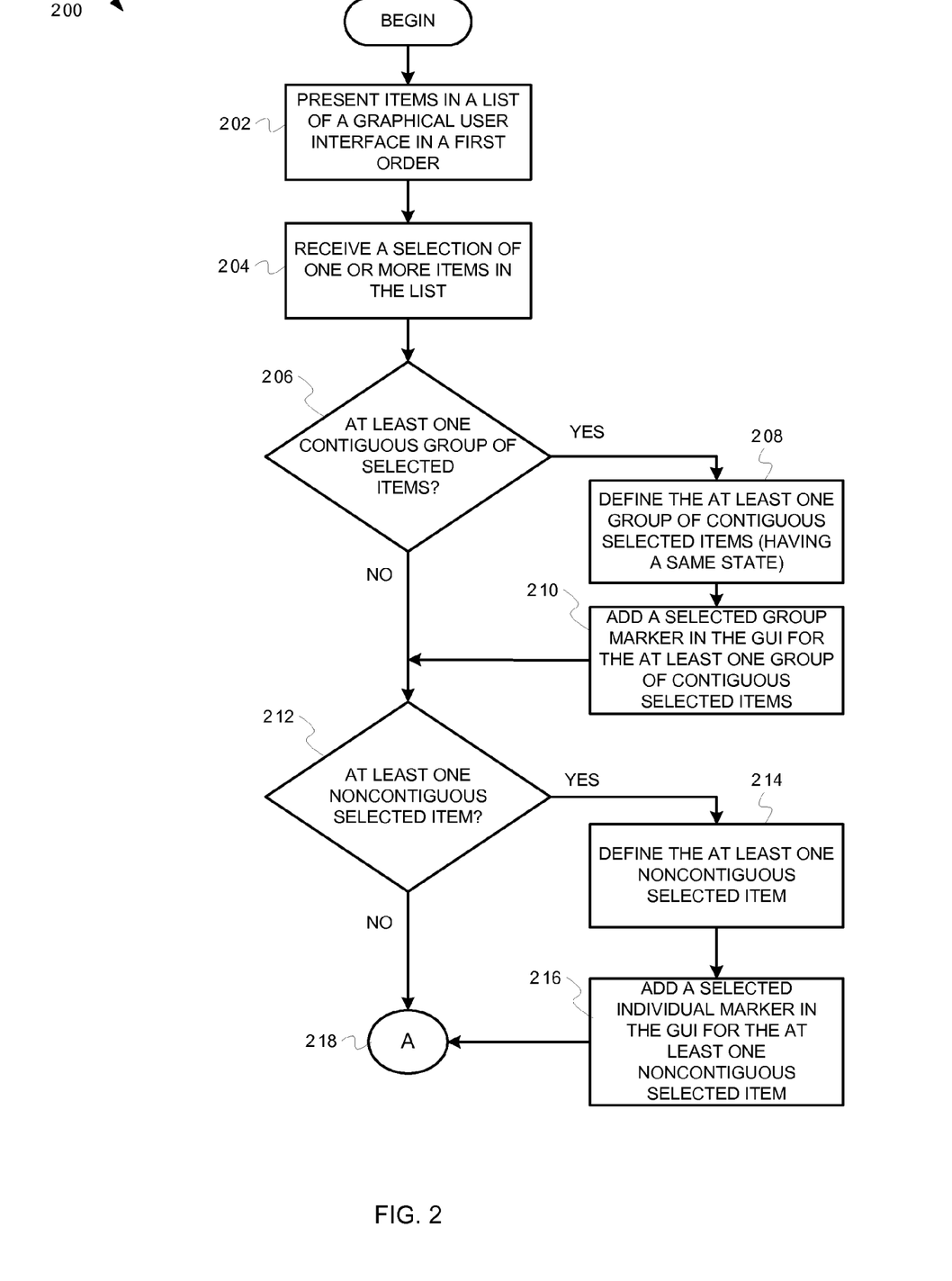
FIGS. 2-3 are flowcharts illustrating locating and managing of selected and nonselected items in a list, according to some example embodiments.
Figure 3:
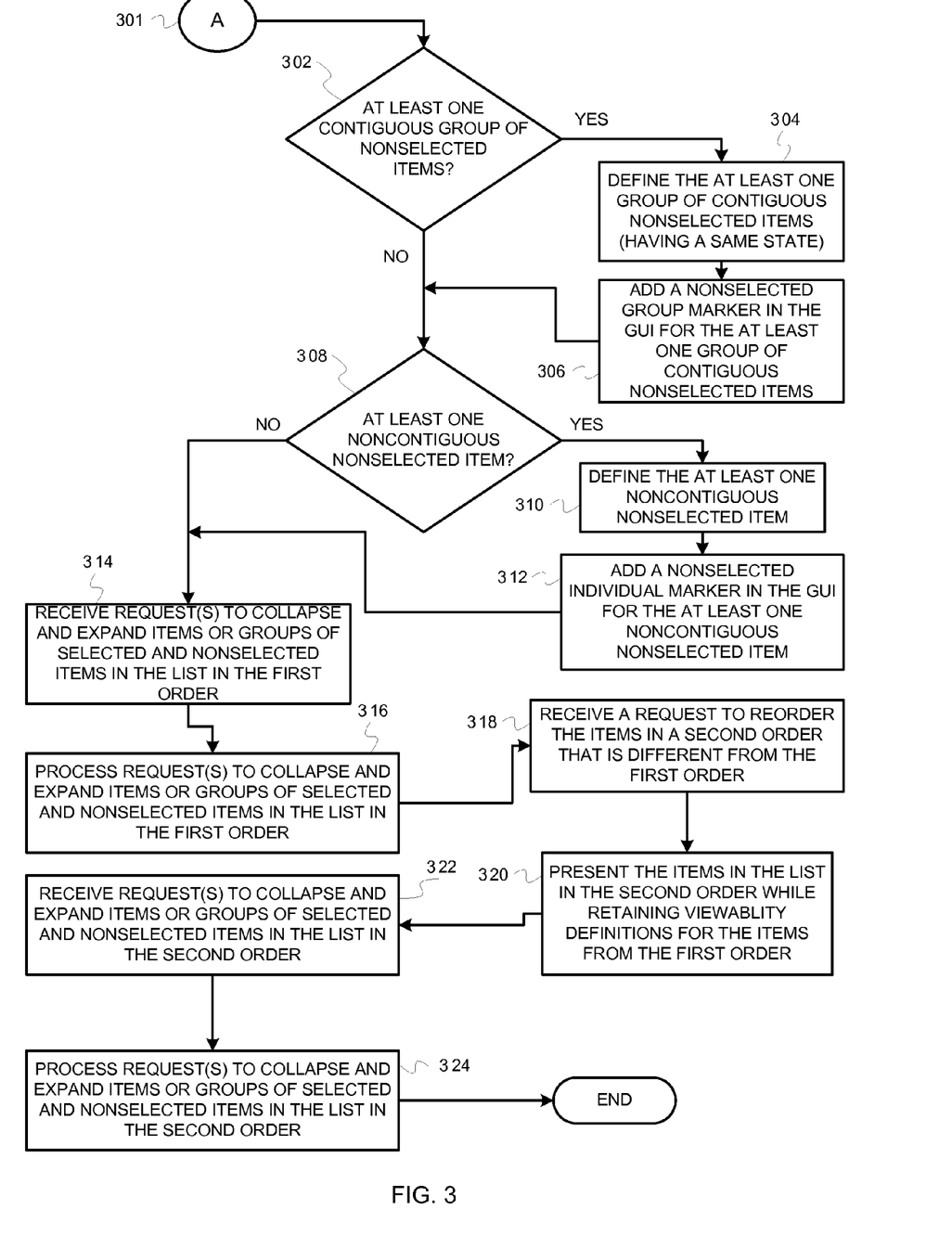

The following section describes FIGS. 2-8. FIGS. 2-3 are flowcharts describing operations, according to some example embodiments. FIGS. 4-8 are screenshots that help illustrate the operations shown in the flowcharts of FIGS. 2-3. Accordingly, the description of FIGS. 2-8 are described together, as appropriate. Also, for the screenshots in FIGS. 4-8 a same reference number is used across different figures when referencing a same component (e.g., buttons, graphics, etc.)

Operations for management of items in a list are now described. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram. Two different flowcharts are now described. FIGS. 2-3 are flowcharts illustrating locating and managing of selected and nonselected items in a list, according to some example embodiments. Flowcharts 200 and 300 of FIGS. 2 and 3, respectively, are described with reference to the computer system 100 of FIG. 1. The operations of the flowchart 200 begin at block 202.

Figure 4:
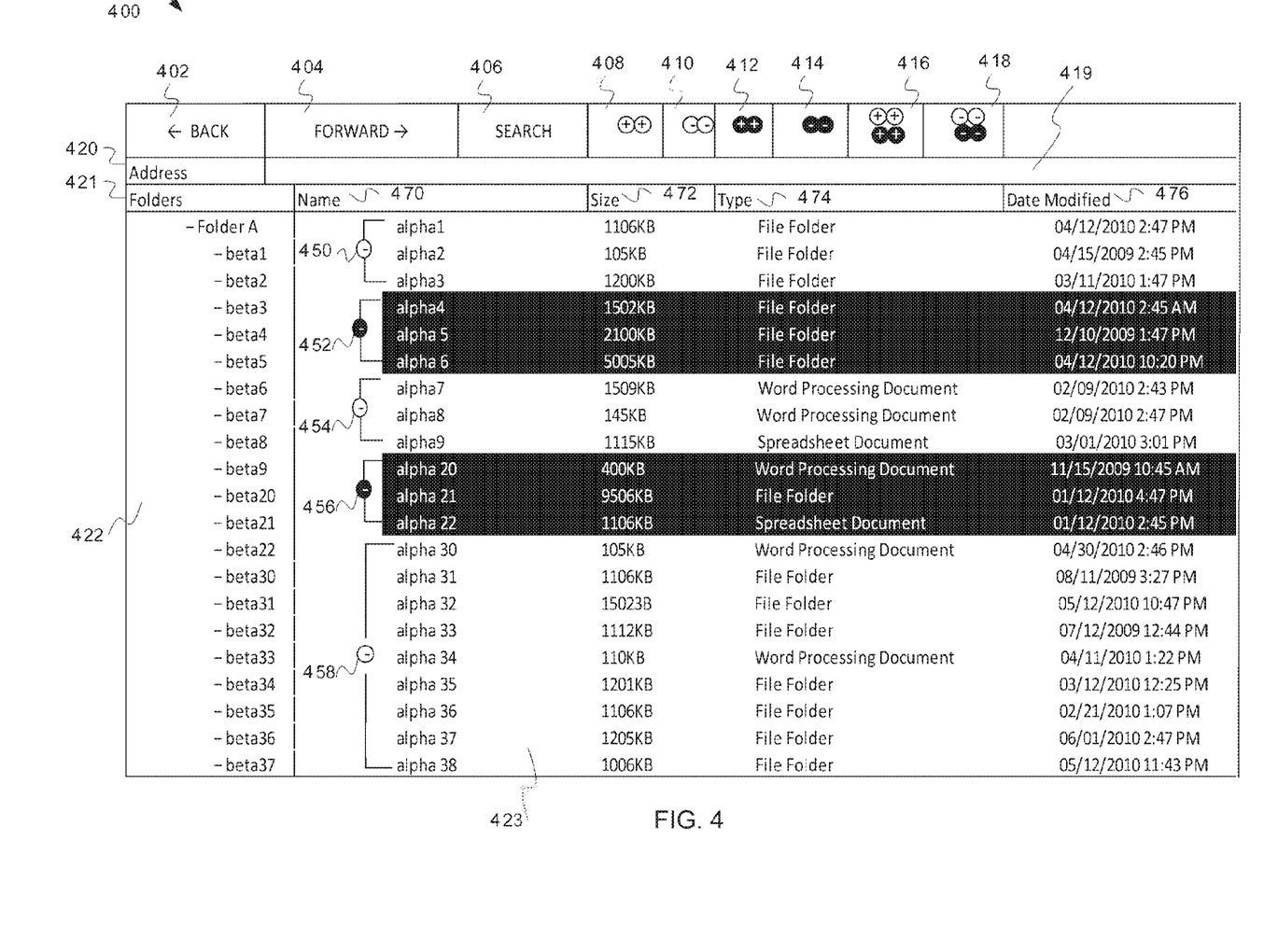
FIG. 4 is a screenshot of items in a list of a graphical user interface in a first order, according to some example embodiments.

At block 202, the item management module 125 presents items in a list of a graphical user interface in a first order. To illustrate, FIG. 4 is a screenshot of items in a list of a graphical user interface in a first order, according to some example embodiments. A screenshot 400 shows a file management application that includes files folders stored in machine-readable media. In this example, the files and folders shown in section 423 are in alphabetical order based on the name. In some other example embodiments, the first order can be an order based on date of creation, size, data of last modification, etc.

The file management application includes a number of buttons across the top of the screenshot 400. In this example, the buttons include a back button 402, a forward button 404, and a search button 406. A user selection of the back button 402 and the forward button 404 causes a change in the display to show the files and folders previously viewed in the back and forward direction, respectively. The buttons also include a search button 406. A user selection of the search button 406 can cause display of another window that will enable a search based on names of files and folders, full text in the files, etc.

The screenshot 400 of the file management application includes a label box 420 for "Address" associated with the input text box 419. In particular, the input text box 419 can show the address of the current directory hierarchy for the directory whose files and folders are being displayed in the section 423. A user can input a different directory hierarchy in the input text box 419, thereby causing the display in the section 423 to show the files and folders in this different directory hierarchy.

The screenshot 400 of the file management application includes a label box 421 for "Folders" associated with a section 422. The section 422 displays the folder that contains the files and folder currently being displayed in the section 423. For example, assume that this folder is "beta2" in the section 422. The section 422 also displays the sibling folders and parent folder in the directory hierarchy relative to the folder whose contents are being displayed in section 423. In this example, the sibling folders displayed in the section 422 include "beta1", "beta2", "beta3", "beta4", "beta5", "beta6", "beta7", "beta8", "beta9", "beta20", "beta21", "beta22", "beta30", "beta31", "beta32", "beta33", "beta34", "beta35", "beta36", and "beta37". In this example, the parent folder displayed in the section 422 is "Folder A". Although not shown, the section 422 can display the children folders of the sibling folders if the sibling folders are expanded.

The screenshot 400 of the file management applications includes boxes 470, 472, 474, and 476 that are associated with four different columns in the section 423. In particular, each row in the section 423 is associated with a file or folder. In this example, each row displays four different attributes for a file or folder (name, size, type and date modified). Accordingly, the boxes 470, 472, 474, and 476 define columns for these four different attributes. The box 470 includes the "Name" label and is associated with a first column that provides the name of the file or folder. The box 472 includes the "Size" label and is associated with a second column that provides the size of the file or folder. The box 474 includes the "Type" label and is associated with a third column that provides a type of the file or folder. The box 476 includes the "Date Modified" label and is associated with a fourth column that provides a date that the file or folder was last modified.

In some example embodiments, the boxes 470-476 can be buttons, pulldown menus, etc. For example, the selection of one of the boxes can determine the order of the files and folders in the section 423. If the box 470 is selected, the files and folders are placed in alphabetical order by their name. If the box 472 is selected, the files and folders are ordered by their sizes (e.g., smallest to largest). If the box 474 is selected, the files and folders are ordered by their type. If the box 476 is selected, the files and folders are order by last date of modification (e.g., earliest to latest).

In this example, six different files or folders shown in the section 423 were selected (alpha4, alpha5, alpha6, alpha20, alpha21, and alpha22). A user can select these files or folders a number of different ways (manual selection, various filtering criteria, etc.). In this example, 15 different files or folders shown in the section 423 were nonselected (alpha1, alpha2, alpha3, alpha7, alpha8, alpha9, alpha30, alpha31, alpha32, alpha33, alpha34, alpha35, alpha36, alpha37, alpha38). Also, in some example embodiments, the files and folders shown in the section 423 have an associated viewability definition. The viewability definition defines whether an item or groups of items in a list are visible or hidden in the graphical user interface.

In some example embodiments, each of the files/folders or contiguous groups of files/folders have an associated marker. The markers are selectable by the user to collapse or expand the associated files/folders. These markers can thereby affect the viewability definitions of the files/folders or contiguous groups of files/folders. In particular, if a marker is selected to collapse the files/folders, the viewability definition changes from visible to hidden. If a marker is selected to expand the files/folders, the viewability definition changes from hidden to visible. Examples of these changes to viewability definitions of items in a list are shown in subsequent screenshots illustrated in FIGS. 5-8 (described below).

A marker 450 (considered a nonselected group marker) is associated with a contiguous group of nonselected files/folders (alpha1, alpha2, and alpha3). A marker 452 (considered a selected group marker) is associated with a contiguous group of selected files/folders (alpha4, alpha5, and alpha6). A marker 454 (considered a nonselected group marker) is associated with a contiguous group of nonselected files/folders (alpha7, alpha8, and alpha9). A marker 458 (considered a selected group marker) is associated with a contiguous group of selected files/folders (alpha30, alpha31, alpha32, alpha33, alpha34, alpha35, alpha36, alpha37, and alpha38).

The screenshot 400 of the file management applications also includes buttons 408-418. A user selection of these buttons expands or collapses all of the selected or all of the nonselected items in the list, in accordance with some example embodiments. Specifically, a user selection of the button 408 causes all items that are nonselected to expand. With reference to the section 423, if any nonselected files or folders are collapsed, the selection of the button 408 causes all these files and folders to expand (changing the viewability definition for these nonselected files and folders from hidden to visible). In the example shown in FIG. 4, all of the nonselected files and folders are expanded. Therefore, selection of the button 408 would not change the viewability definition for these files and folders, thereby not changing the display in the section 423.

A user selection of the button 410 causes all items that are nonselected to collapse. With reference to the section 423, if any nonselected files or folders are expanded, the selection of the button 410 causes all these files and folders to collapse (changing the viewability definition for these nonselected files and folders from visible to hidden). In the example shown in FIG. 4, if a user selected the button 410, all of the nonselected files and folders (alpha1, alpha2, alpha3, alpha7, alpha8, alpha9, alpha30, alpha31, alpha32, alpha33, alpha34, alpha35, alpha36, alpha37, and alpha38) would collapse. Therefore, selection of the button 410 would change the viewability definition for these files and folders from visible to hidden. These files and folders would not be viewable in the section 423. Examples of hidden files and folders are shown in subsequent screenshots illustrated in FIGS. 5-8 (described below).

A user selection of the button 412 causes all items that are selected to expand. With reference to the section 423, if any selected files or folders are collapsed, the selection of the button 412 causes all these files and folders to expand (changing the viewability definition for these selected files and folders from hidden to visible). In the example shown in FIG. 4, all of the selected files and folders are expanded. Therefore, selection of the button 412 would not change the viewability definition for these files and folders, thereby not changing the display in the section 423.

A user selection of the button 414 causes all items that are selected to collapse. With reference to the section 423, if any selected files or folders are expanded, the selection of the button 414 causes all these files and folders to collapse (changing the viewability definition for these selected files and folders from visible to hidden). In the example shown in FIG. 4, if a user selected the button 414, all of the selected files and folders (alpha4, alpha5, alpha6, alpha20, alpha21, and alpha22) would collapse. Therefore, selection of the button 414 would change the viewability definition for these files and folders from visible to hidden. These files and folders would not be viewable in the section 423. Examples of hidden files and folders are shown in subsequent screenshots illustrated in FIGS. 5-8 (described below).

A user selection of the button 416 causes all items (both selected and nonselected) to expand. With reference to the section 423, if any files or folders are collapsed, the selection of the button 416 causes all these files and folders to expand (changing the viewability definition for these files and folders from hidden to visible). In the example shown in FIG. 4, all of the selected files and folders are expanded. Therefore, selection of the button 416 would not change the viewability definition for these files and folders, thereby not changing the display in the section 423.

A user selection of the button 418 causes all items (both selected and nonselected) to collapse. With reference to the section 423, if any files or folders are expanded, the selection of the button 418 causes all these files and folders to collapse (changing the viewability definition for these files and folders from visible to hidden). In the example shown in FIG. 4, if a user selected the button 418, all of the selected files and folders in the section 423 would collapse. Therefore, selection of the button 418 would change the viewability definition for all of these files and folders from visible to hidden. These files and folders would not be viewable in the section 423. Examples of hidden files and folders are shown in subsequent screenshots illustrated in FIGS. 5-8 (described below).

Returning now to the flowchart 200 of FIG. 2, after presenting the items in the list at block 202, the operations continue at block 204.

At block 204, the item management module 125 receives a selection of one or more items in the list. For example, a user could select one to any number of items in the list using, for example, a mouse or keyboard input. With reference to the screenshot 400 of FIG. 4, the item management module 125 receives input to select six files and folders (alpha4, alpha5, alpha6, alpha20, alpha 21, and alpha22). The operations continue at block 206.

At block 206, the item management module 125 determines whether there is at least one group of contiguous selected items, after receiving the selection of the one or more items in the list. With reference to the screenshot 400 of FIG. 4, the item management module 125 determines that there are two contiguous groups of selected items. The first group of contiguous selected items includes alpha4, alpha5, and alpha6. The second group of contiguous selected items includes alpha20, alpha21, and alpha22. If there is at least one group of contiguous selected items, operations continue at block 208. Otherwise, operations continue at block 210 (described below).

At block 208, the item management module 125 defines the at least one group of contiguous selected items. With reference to the screenshot 400 of FIG. 4, the item management module 125 defines a first group (alpha4, alpha5, and alpha6) and a second group (alpha20, alpha21, and alpha22). In some example embodiments, each item in a group has a same state (e.g., selected/nonselected, viewability definition, order, etc.). Accordingly, the different groups of contiguous selected items can be independent of each other. For example, a user can hide one group and have a second group remain visible. In some example embodiments, each item in the list has an associated data structure (e.g., model, class, etc.) that is stored in machine-readable media. The data structure can store the state of the item. The item management module 125 can update this associated data structure as the state is changed. For example, if a user changes a viewability definition of an item, the item management module 125 updates this state attribute in the associated data structure. In some example embodiments, the same associated data structure can store an attribute that defines whether the item is part of a contiguous group. Alternatively or in addition, a separate data structure can be created for each contiguous group. The item management module 125 can store and update the state of the group in this separate data structure. Accordingly, as part of defining the at least one group of contiguous selected items, the item management module 125 can create update data structures for the individual items in the group, create and update a separate data structure for the group, etc. Operations continue at block 210.

At block 210, the item management module 125 adds a selected group marker in the graphical user interface for the at least one group of contiguous selected items. With reference to the screenshot 400 of FIG. 4, the item management module 125 adds two different selected group markers. A first marker is a selected group marker 452 for alpha4, alpha5, and alpha6. A second marker is a selected group marker 456 for alpha20, alpha21, and alpha22. Because the groups are currently viewable, the markers have a '−' symbol. As further described below, these groups of contiguous selected items can be collapsed and removed from the view by an input selection of the associated marker. Also, if collapsed, the marker remains (changing from a '−' to a '+' symbol) and a number is also added to the graphical user interface that indicates the number of items that have been collapsed. Such operations are described below. Operations continue at block 212.

Figure 6:
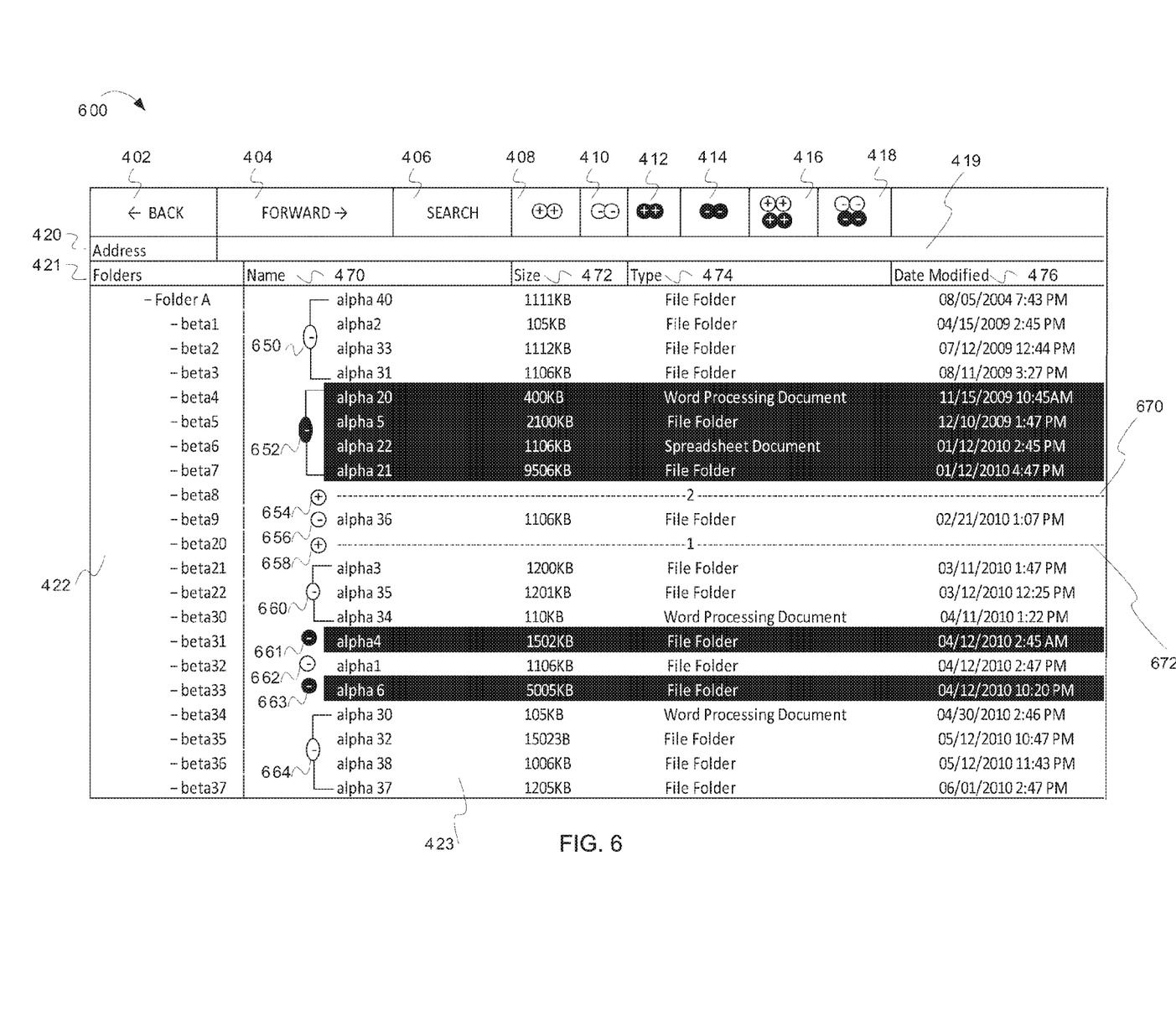
FIG. 6 is a screenshot of items in a list of a graphical user interface in a second order, wherein viewability definitions for the items are retained from the first order, according to some example embodiments.
Figure 7:
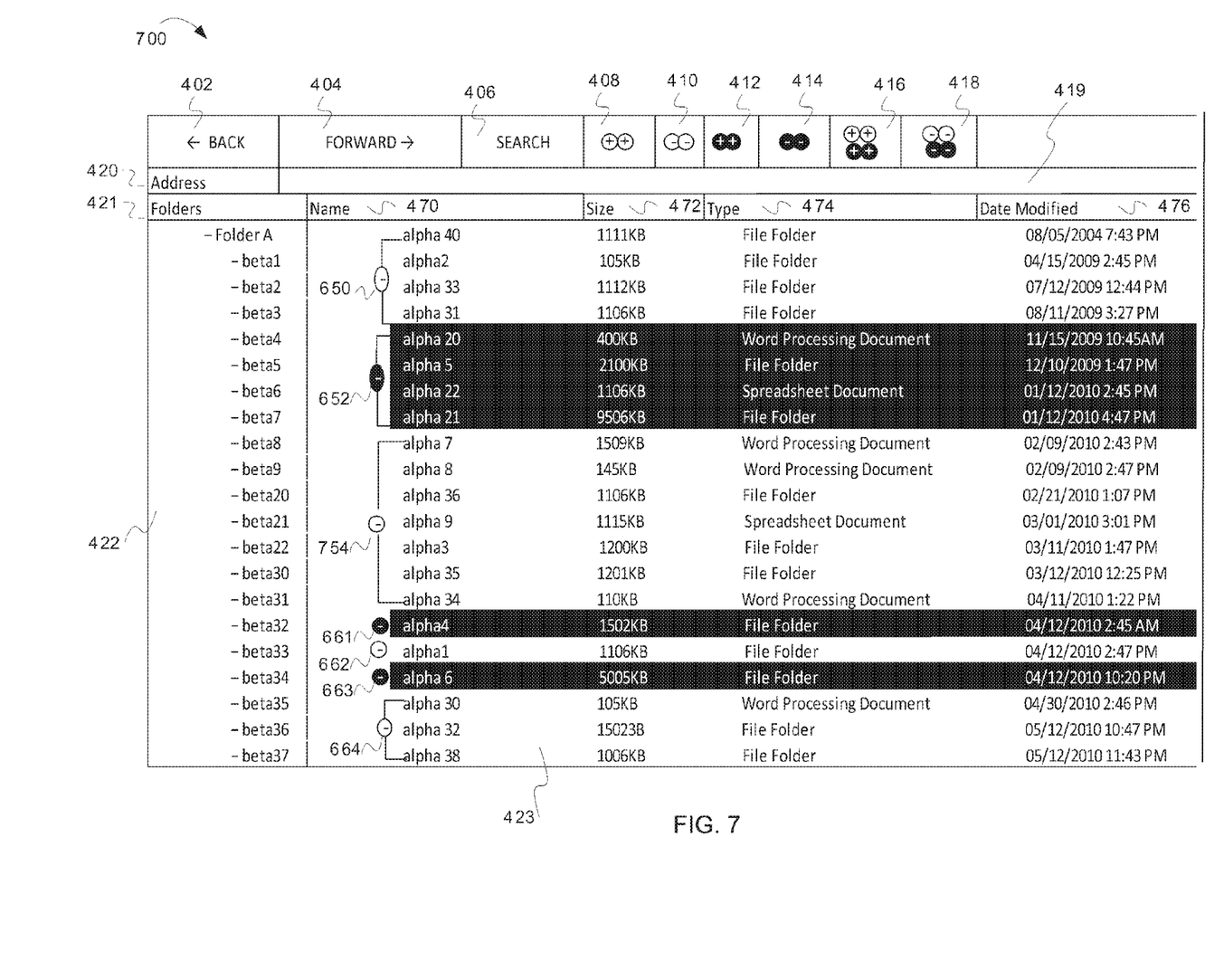
FIG. 7 is a screenshot of items in a list of a graphical user interface in a second order, wherein viewability definitions for the items are retained from the first order, according to some other example embodiments.
Figure 8:
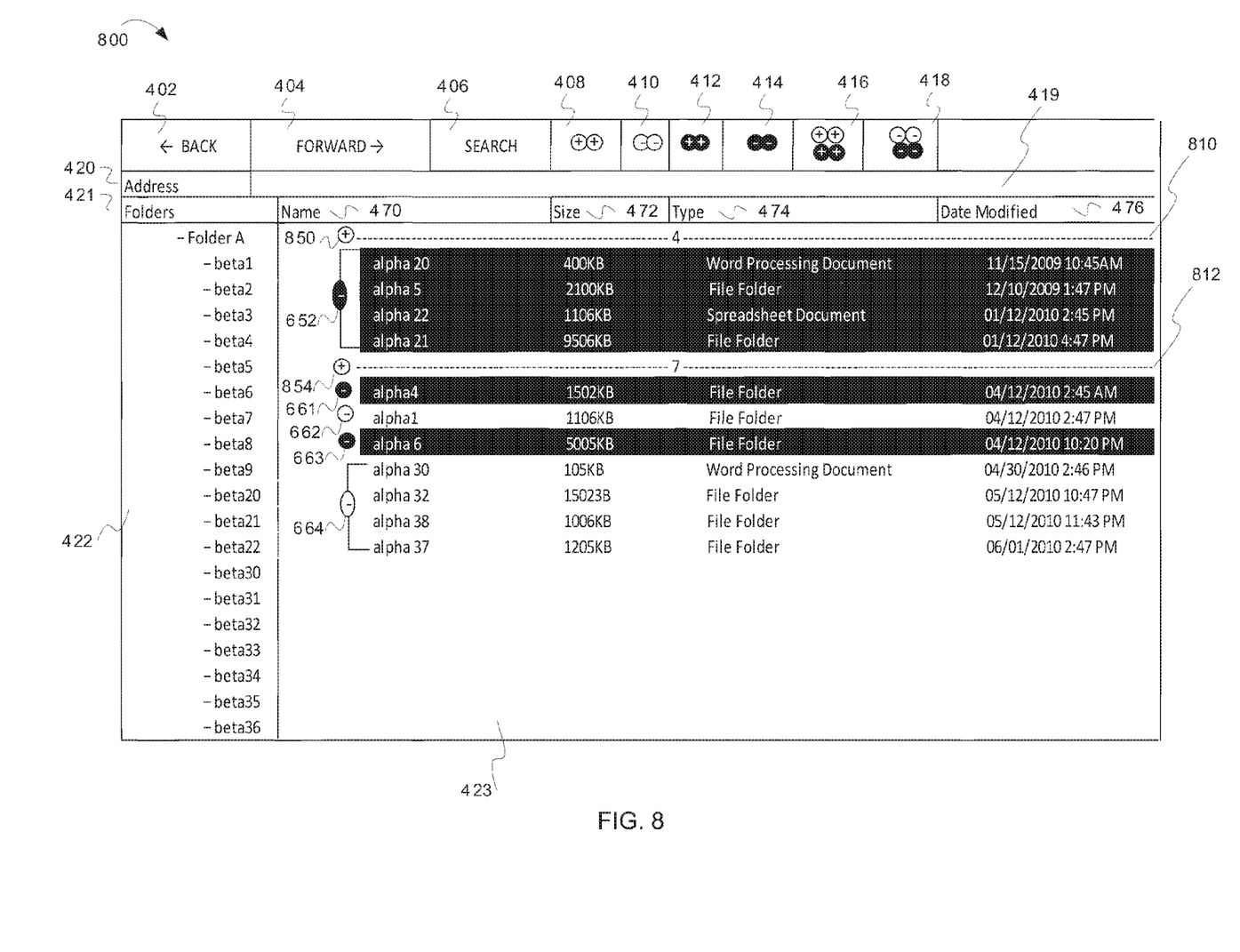
FIG. 8 is a screenshot of items in a list of a graphical user interface in a second order, wherein a group of contiguous nonselected items are collapsed, according to some example embodiments.

At block 212, the item management module 125 determines whether there is at least one noncontiguous selected item, after receiving the selection of the one or more items in the list. In particular, the item management module 125 determines whether there are individual selected items that are not contiguously part of a group of other selected items. With reference to the screenshot 400 of FIG. 4, the item management module 125 determines that there are no noncontiguous selected items. However, subsequent screenshots in FIGS. 6-8 provide examples of such items. If there is at least one noncontiguous selected item, operations continue at block 214. Otherwise, operations continue at point 218 (described below).

At block 214, the item management module 125 defines the at least one noncontiguous selected item. With reference to the screenshot 600 of FIG. 6 (described in more detail below), the item management module 125 defines a first noncontiguous selected item (alpha4) and a second noncontiguous selected item (alpha6). In some example embodiments, each noncontiguous selected item has a state (e.g., selected/nonselected, viewability definition, order, etc.). This state can be independent of states of contiguous groups and other noncontiguous items. For example, a user can hide one noncontiguous selected item and have a second noncontiguous selected item remain visible. The item management module 125 can update this associated data structure as the state is changed. For example, if a user changes a viewability definition of an item, the item management module 125 updates this state attribute in the associated data structure. Accordingly, as part of defining the at least one noncontiguous selected item, the item management module 125 can create update data structures for the individual items. Operations continue at block 216.

At block 216, the item management module 125 adds a selected individual marker in the graphical user interface for the at least noncontiguous selected item. With reference to the screenshot 400 of FIG. 4, there are no noncontiguous selected items. However, examples of these items are shown in FIGS. 6-8 (described below). For example, see markers 661 and 663 in FIG. 6. As further described below, these noncontiguous selected items can be collapsed and removed from the view by an input selection of the associated marker. Also, if collapsed, the marker remains (changing from a '−' to a '+' symbol) and a number is also added to the graphical user interface that indicates the number of items that have been collapsed. In this case, the number is one. Such operations are described below. Operations continue at point 218.

At point 218, the operations of the flowchart 200 are complete and continue to the beginning of the operations at the flowchart 300 (point 301), which is now described. At point 301, the operations of the flowchart 300 are initiated and are a continuation of the operations of the flowchart 200. After the point 301, the operations continue at block 302.

At block 302, the item management module 125 determines whether there is at least one group of contiguous nonselected items, after receiving the selection of the one or more items in the list. With reference to the screenshot 400 of FIG. 4, the item management module 125 determines that there are three contiguous groups of nonselected items. The first group of contiguous nonselected items includes alpha1, alpha2, and alpha3. The second group of contiguous nonselected items includes alpha7, alpha8, and alpha9. The third group of contiguous nonselected items includes alpha30, alpha31, alpha32, alpha33, alpha34, alpha35, alpha36, alpha37, and alpha38. If there is at least one group of contiguous nonselected items, operations continue at block 304. Otherwise, operations continue at point 308 (described below).

At block 304, the item management module 125 defines the at least one group of contiguous nonselected items. With reference to the screenshot 400 of FIG. 4, the item management module 125 defines a first group (alpha1, alpha2, and alpha3), a second group (alpha7, alpha8, and alpha9), and a third group (alpha30, alpha31, alpha32, alpha33, alpha34, alpha35, alpha36, alpha37, and alpha38). In some example embodiments, each item in a group has a same state (e.g., selected/nonselected, viewability definition, order, etc.). Accordingly, the different groups of contiguous nonselected items can be independent of each other. For example, a user can hide one group and have a second group remain visible. As described above, in some example embodiments, each item in the list has an associated data structure (e.g., model, class, etc.) that is stored in machine-readable media. The data structure can store the state of the item. The item management module 125 can update this associated data structure as the state is changed. For example, if a user changes a viewability definition of an item, the item management module 125 updates this state attribute in the associated data structure. In some example embodiments, the same associated data structure can store an attribute that defines whether the item is part of a contiguous group. Alternatively or in addition, a separate data structure can be created for each contiguous group. The item management module 125 can store and update the state of the group in this separate data structure. Accordingly, as part of defining the at least one group of contiguous nonselected items, the item management module 125 can create update data structures for the individual items in the group, create and update a separate data structure for the group, etc. Operations continue at block 306.

At block 306, the item management module 125 adds a nonselected group marker in the graphical user interface for the at least one group of contiguous nonselected items. With reference to the screenshot 400 of FIG. 4, the item management module 125 adds three different nonselected group markers. A first marker is a nonselected group marker 450 for alpha1, alpha2, and alpha3. A second marker is a nonselected group marker 454 for alpha7, alpha8, and alpha9. A third marker is an nonselected group marker 458 for alpha30, alpha31, alpha32, alpha33, alpha34, alpha35, alpha36, alpha37, and alpha38. Because the groups are currently viewable, the markers have a '−' symbol. As further described below, these groups of contiguous nonselected items can be collapsed and removed from the view by an input selection of the associated marker. Also, if collapsed, the marker remains (changing from a '−' to a '+' symbol) and a number is also added to the graphical user interface that indicates the number of items that have been collapsed. Such operations are described below. Operations continue at block 308.

At block 308, the item management module 125 determines whether there is at least one noncontiguous nonselected item, after receiving the selection of the one or more items in the list. In particular, the item management module 125 determines whether there are individual nonselected items that are not contiguously part of a group of other nonselected items. With reference to the screenshot 400 of FIG. 4, the item management module 125 determines that there are no noncontiguous selected items. However, subsequent screenshots in FIGS. 6-8 provide examples of such items. If there is at least one noncontiguous nonselected item, operations continue at block 310. Otherwise, operations continue at block 314 (described below).

At block 310, the item management module 125 defines the at least one noncontiguous nonselected item. With reference to the screenshot 600 of FIG. 6 (described in more detail below), the item management module 125 defines a first noncontiguous nonselected item (alpha36) and a second noncontiguous nonselected item (alpha1). In some example embodiments, each noncontiguous nonselected item has a state (e.g., selected/nonselected, viewability definition, order, etc.). This state can be independent of states of contiguous groups and other noncontiguous items. For example, a user can hide one noncontiguous nonselected item and have a second noncontiguous nonselected item remain visible. The item management module 125 can update this associated data structure as the state is changed. For example, if a user changes a viewability definition of an item, the item management module 125 updates this state attribute in the associated data structure. Accordingly, as part of defining the at least one noncontiguous nonselected item, the item management module 125 can create update data structures for the individual items. Operations continue at block 312.

At block 312, the item management module 125 adds a nonselected individual marker in the graphical user interface for the at least one noncontiguous nonselected item. With reference to the screenshot 400 of FIG. 4, there are no noncontiguous nonselected items. However, examples of these items are shown in FIGS. 6-8 (described below). For example, see markers 656 and 662 in FIG. 6. As further described below, these noncontiguous nonselected items can be collapsed and removed from the view by an input selection of the associated marker. Also, if collapsed, the marker remains (changing from a '−' to a '+' symbol) and a number is also added to the graphical user interface that indicates the number of items that have been collapsed. In this case, the number is one. Such operations are described below. Operations continue at block 314. In the operations described in the following blocks of the flowchart 300, the items in the list are manipulated based on commands received. As described below, the manipulating can include collapsing, expanding, and reordering of groups or individual items.

At block 314, the item management module 125 receives request(s) to collapse and expand items or groups of items of selected and nonselected items in the list. In some example embodiments, the item management module 125 receives the request(s) in response to a user selecting one or more of the markers (e.g., markers 450-458). With reference to FIG. 4 as an example, assume that a user selects the marker 454. In some other example embodiments, the item management module 125 receives the request(s) in response to a user selecting one of the buttons 408-418. In particular, as described above, a user selection of these buttons expands or collapses all of the selected or all of the nonselected items in the list, in accordance with some example embodiments. Operations continue at block 316.

At block 316, the item management module 125 processes the request(s) to collapse and expand items or groups of items of selected and nonselected items in the list in the first order. If the items or groups of items are expanded, the selection of the associated marker causes the items or groups of items to collapse—these items would be hidden from the graphical user interface. If the items or groups of items are collapsed, the selection of the associated marker causes the items or groups of items to expand—these items would be viewable in the graphical user interface. Accordingly, the selection of the markers can toggle the viewability definition of the associated items (visible to hidden and vice versa).

Figure 5:
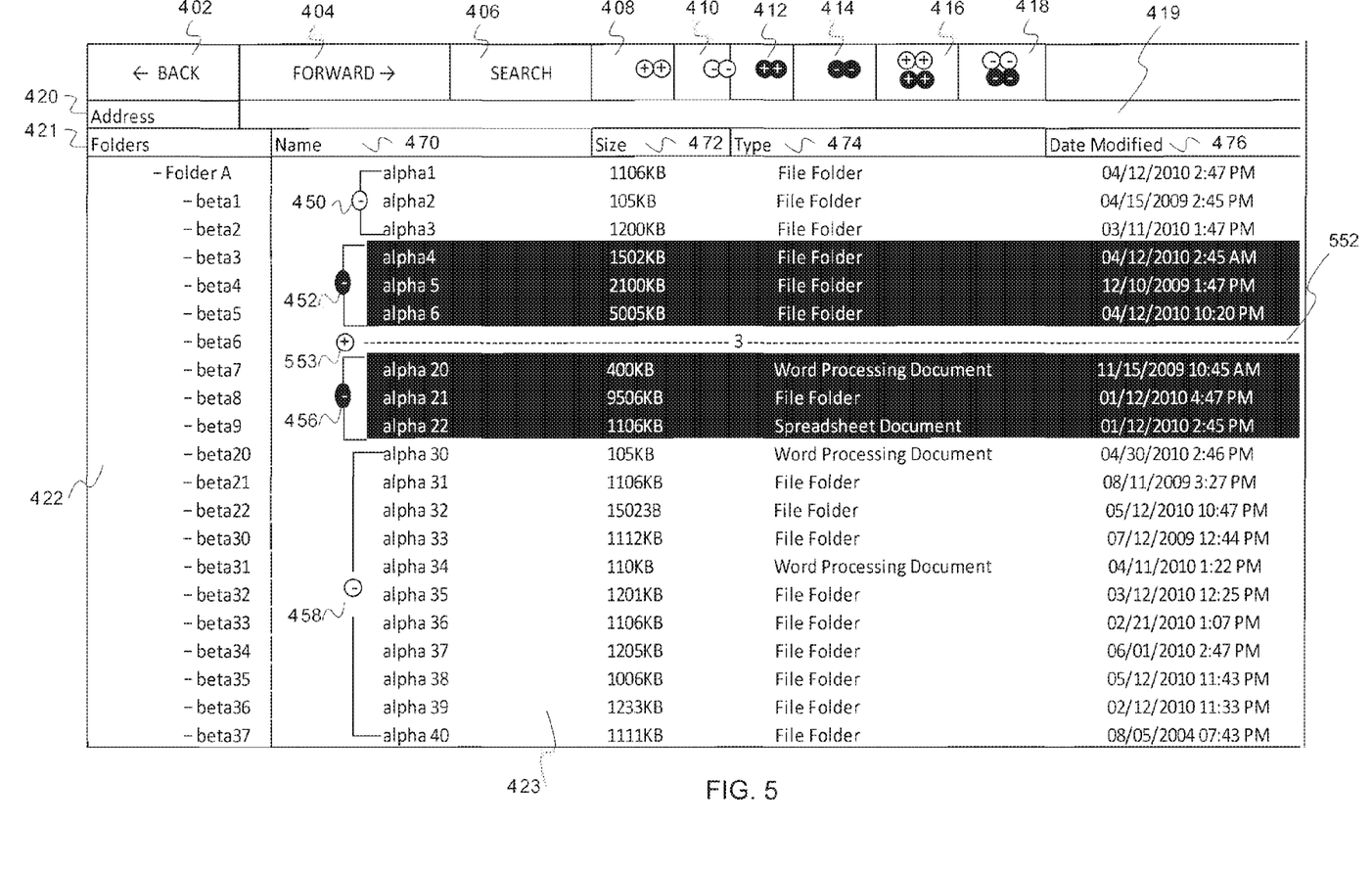
FIG. 5 is a screenshot of items in a list of a graphical user interface in a first order, wherein a group of contiguous nonselected items are collapsed, according to some example embodiments.

Returning to the example of FIG. 4 where the user selects the marker 454, because the items are expanded, the response to the selection of the marker 454 would collapse these items (alpha7, alpha8, and alpha9). These items would be hidden from the graphical user interface. To illustrate, FIG. 5 is a screenshot of items in a list of a graphical user interface in a first order, wherein a group of contiguous nonselected items are collapsed, according to some example embodiments. In particular, a screenshot 500 shows the file management application from the screenshot 400 of FIG. 4, after the contiguous group of nonselected items (alpha7, alpha8, and alpha9) has collapsed. As shown, the items (alpha7, alpha8, and alpha9) have been replaced with a line 552 that includes the number 3 (representing the number of items that are hidden). Also, the marker 454 has changed to a marker 553 and positioned next to the line 552. The marker 553 includes a '+' symbol (indicating that selection would expand to show the hidden items if the marker 553 is selected). Returning to the flowchart 300, the operations continue at block 318.

At block 318, the item management module 125 receives a request to reorder the items in a second order that is different from the first order. In some example embodiments, the item management module 125 receives the request to reorder in response to a user selecting one of the boxes 470-476 (as described above). With reference to FIG. 5, the items are in alphabetical order. Assume that a user selects the box 476. In response, the item management module 125 receives a request to reorder the items according to the last date of modification. The operations continue at block 320.

At block 320, the item management module 125 presents the items in the list in the second order, while retaining the viewability definitions for the items from the first order. FIGS. 6-7 are screenshots to illustrate this operation, according to some example embodiments. Reordering can cause selected items that are visible and selected items that are hidden to be contiguously located next to each other. Similarly, reordering can cause nonselected items that are visible and nonselected items that are hidden to be contiguously located next to each other. In some example embodiments, a user can configure how such items should be presented in the second reorder. In some example embodiments, if a visible selected (or nonselected) item and hidden selected (or nonselected) item are in a contiguous group after the reordering, the two selected (nonselected) items can both be viewable. Alternatively, the two selected (nonselected) items can both be hidden. Also in some example embodiments, if a visible selected (or nonselected) item and hidden selected (or nonselected) item are in a contiguous group after the reordering, the two items can be kept as a group and not merged. FIG. 6 is a screenshot of the items after reordering, wherein viewability definitions for the items are retained from the first order and wherein the two items are not merged to form new groups. Alternatively, the two items can be merged together to form a new group. FIG. 7 is a screenshot of the items after reordering, wherein viewability definitions for the items are retained from the first order and wherein the two items are merged to form new groups. FIGS. 6 and 7 are now described.

FIG. 6 is a screenshot of items in a list of a graphical user interface in a second order, wherein viewability definitions for the items are retained from the first order, according to some example embodiments. In particular, a screenshot 600 shows the file management application from the screenshot 500 of FIG. 5, after changing the order of the items based on the last date of modification. In this example, the files and folders are ordered based on the last date of modification (earliest to latest). As shown, the viewability definition for the items from the first order is retained as part of the viewing based on the second order. In particular, once items are hidden or visible and no matter how the items are reordered, the hidden items remain hidden and the visible items remain visible, according to some example embodiments. Therefore, the user is able to hide some or all of the items that are not of interest so that only the ones that are of interest remain visible and can be viewed together, even as the order is changed. Also as shown, as items are reordered, their grouping can be different. Specifically, items that were grouped together in one order may not necessarily be grouped together in another order.

A marker 650 (considered as a nonselected group marker) is associated with a contiguous group of nonselected files/folders (alpha40, alpha2, alpha33, and alpha31). A marker 652 (considered as a selected group marker) is associated with a contiguous group of selected files/folders (alpha20, alpha5, alpha22, and alpha21). A marker 654 (considered as a nonselected group marker) is associated with two hidden files/folders. These hidden files/folders are represented as a line 670 that includes the number 2 (representing the number of items that are hidden). The two hidden files/folders are hidden because they were previously hidden when being viewed in the first order. In particular, the two hidden files/folders include alpha7 and alpha8 (see FIGS. 4-5). A marker 656 (considered as a nonselected individual marker) is associated with a noncontiguous nonselected file/folder (alpha36).

A marker 658 (considered as a nonselected individual marker) is associated with one hidden file/folder. This hidden file/folder is represented as a line 672 that includes the number 1 (representing the number of items that are hidden). The hidden file/folder is hidden because it was previously hidden when being viewed in the first order. In particular, the hidden file/folder includes alpha9 (see FIGS. 4-5). A marker 660 (considered as a nonselected group marker) is associated with a contiguous group of nonselected files/folders (alpha3, alpha35, and alpha34). A marker 661 (considered as a selected individual marker) is associated with a noncontiguous selected file/folder (alpha4). A marker 662 (considered as a nonselected individual marker) is associated with a noncontiguous nonselected file/folder (alpha1). A marker 663 (considered as a selected individual marker) is associated with a noncontiguous selected file/folder (alpha6). A marker 664 (considered as a nonselected group marker) is associated with a contiguous group of nonselected files/folders (alpha30, alpha32, alpha38, and alpha37).

FIG. 7 is a screenshot of items in a list of a graphical user interface in a second order, wherein viewability definitions for the items are retained from the first order, according to some other example embodiments. In particular, a screenshot 700 shows the file management application from the screenshot 500 of FIG. 5, after changing the order of the items based on the last date of modification. Also, the screenshot 700 shows the merging of selected and nonselected contiguous items to form new groups. Also, in this example, if a hidden item is merged with a viewable item, the hidden item is made viewable. In this example, the files and folders are ordered based on the last date of modification (earliest to latest). As shown, the viewability definition for the items from the first order is retained as part of the viewing based on the second order.

The screenshot 700 includes the same markers 650, 652, 661, 662, and 663 and their associated items and groups of items as shown in the screenshot 600 of FIG. 6. The screenshot 700 also includes the same marker 664 and the associated group of items as shown in the screenshot 600 of FIG. 6, except that alpha37 is not viewable because of the limit of the viewing area of the section 423.

The screenshot 700 includes a new group in comparison to the grouping shown in the screenshot 600. In particular, a marker 754 (considered as a nonselected group marker) is associated with a contiguous group of nonselected files/folders (alpha7, alpha8, alpha36, alpha9, alpha3, alpha35, and alpha34). As shown in this example, the merged group caused the hidden files/folders to be made viewable (alpha7, alpha8, and alpha9).

Returning now to the flowchart 300 of FIG. 3, after presenting the items in the list at block 320, the operations continue at block 322.

At block 322, the item management module 125 receives request(s) to collapse and expand items or groups of items of selected and nonselected items in the list in the second order. In some example embodiments, the item management module 125 receives the request(s) in response to a user selecting one or more of the markers (e.g., markers 650, 652, 754, 661, 662, 663 and 664 of FIG. 7). In some other example embodiments, the item management module 125 receives the request(s) in response to a user selecting one of the buttons 408-418. In particular, as described above, a user selection of these buttons expands or collapses all of the selected or all of the nonselected items in the list, in accordance with some example embodiments. Operations continue at block 324.

At block 324, the item management module 125 processes the request(s) to collapse and expand items or groups of items of selected and nonselected items in the list in the second order. If the items or groups of items are expanded, the selection of the associated marker causes the items or groups of items to collapse—these items would be hidden from the graphical user interface. If the items or groups of items are collapsed, the selection of the associated marker causes the items or groups of items to expand—these items would be viewable in the graphical user interface. Accordingly, the selection of the markers can toggle the viewability definition of the associated items (visible to hidden and vice versa).

Returning to the example of FIG. 7, assume the user selects the markers 650 and 754. Because the items are expanded, the response to the selection of the markers 650 and 754 would collapse items (alpha40, alpha2, alpha33, alpha31, alpha7, alpha8, and alpha9) and items (alpha7, alpha8, alpha36, alpha9, alpha3, alpha35, and alpha34), respectively. These items would be hidden from the graphical user interface. To illustrate, FIG. 8 is a screenshot of items in a list of a graphical user interface in a second order, wherein a group of contiguous nonselected items are collapsed, according to some example embodiments. In particular, a screenshot 800 shows the file management application from the screenshot 700 of FIG. 7, after the contiguous group of nonselected items (alpha40, alpha2, alpha33 and alpha31) and the contiguous group of nonselected items (alpha7, alpha8, alpha36, alpha9, alpha3, alpha35, and alpha34) have collapsed.

As shown, the items (alpha40, alpha2, alpha33, and alpha31) have been replaced with a line 810 that includes the number 4 (representing the number of items that are hidden). Also, the marker 650 has changed to a marker 850 and positioned next to the line 810. The marker 850 includes a '+' symbol (indicating that selection would expand to show the hidden items if the marker 850 is selected). Also, as shown, the items (alpha7, alpha8, alpha36, alpha9, alpha3, alpha35, and alpha34) have been replaced with a line 812 that includes the number 7 (representing the number of items that are hidden). The marker 754 has changed to a marker 854 and positioned next to the line 812. The marker 854 includes a '+' symbol (indicating that selection would expand to show the hidden items if the marker 854 is selected). Returning to the flowchart 300, the operations are shown as completed. However, these operations can continue with the ordering continue to change, the collapsing and expanding of items, etc.

Embodiments are not limited to the example flowcharts depicted in the above figures. Embodiments can perform additional operations, fewer operations, operations in parallel, etc. For instance, referring to FIGS. 2-3, the operations can include a collapse or expansion operations prior to reordering, multiple reordering can occur prior to collapse or expansion operations, etc.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for optimizing design space efficiency as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   presenting items in a list of a graphical user interface in a first order, the first order including at least one of alphabetical, size and date modified;
   in response to a plurality of items being selected in the graphical user interface, defining a first state for the plurality of items as selected items and a second state for a set of one or more unselected items in the list as unselected, wherein the items in the list have a viewability definition, the viewability definition defining whether the items in the list are visible or hidden in the graphical user interface in the first order;

graphically indicating via the graphical user interface the plurality of items as selected items and the set of items as unselected items;

in response to a determination that the plurality of items selected creates at least one contiguous group of nonselected items, adding a nonselected group marker in the graphical user interface for the at least one contiguous group of nonselected items, wherein selection of the nonselected group marker toggles the viewability definition between visible and hidden for the at least one contiguous group of nonselected items;

receiving a request to reorder the items in the list in a second order that is different from the first order, the second order including at least one of alphabetical, size and date modified; and presenting the items in the list in the second order, wherein the items in the list retain their viewability definition and still indicate being selected or nonselected from the graphical user interface in the first order during presentation of the items in the list in the second order; and in response to a determination that the plurality of items selected creates at least one contiguous group of selected items, adding a selected group marker in the graphical user interface for the at least one contiguous group of selected items, wherein selection of the selected group marker toggles the viewability definition between visible and hidden for the at least one contiguous group of selected items.

2. The method of claim 1, wherein said defining the first state for the plurality of items as selected items and the second state for the set of one or more unselected items in the list as unselected comprises:

generating a first data structure that represents the plurality of items;

indicating each of the plurality of items in the first data structure;

setting a first value in the first data structure to indicate the plurality of items as selected items;

generating a second data structure that represents the set of one or more items;

indicating each of the set of one or more items in the second data structure; and setting a second value in the second data structure to indicate the set of items as unselected items.

3. The method of claim 1, wherein a file navigation tool comprises the graphical user interface.

4. A computer program product for managing items in a list, the computer program product comprising:

a non-transitory computer readable storage medium having computer readable program code embodied therewith, the computer readable program code configured to, present the items in the list of a graphical user interface in a first order, the first order including at least one of alphabetical, size and date modified;

receive a selection of one or more of the items in the list, wherein the items in the list have a viewability definition, the viewability definition defining whether the items in the list are visible or hidden in the graphical user interface in the first order;

in response to a determination that the selection creates at least one contiguous group of nonselected items, add a nonselected group marker in the graphical user interface for the at least one contiguous group of nonselected items, wherein selection of the nonselected group marker toggles the viewability definition between visible and hidden for the at least one contiguous group of nonselected items;

receive a request to reorder the items in the list in a second order that is different from the first order, the second order including at least one of alphabetical, size and date modified;

present the items in the list in the second order, wherein the items in the list retain their viewability definition and still indicate being selected or nonselected from the graphical user interface in the first order during presentation of the items in the list in the second order; and in response to a determination that the selection creates at least one contiguous group of selected items, add a selected group marker in the graphical user interface for the at least one contiguous group of selected items, wherein selection of the selected group marker toggles the viewability definition between visible and hidden for the at least one contiguous group of selected items.

5. The computer program product of claim 4, wherein the computer readable program code is configured to, in response to a determination that the selection creates at least one noncontiguous nonselected item, add a nonselected individual marker in the graphical user interface for the at least one noncontiguous nonselected item, wherein selection of the nonselected individual marker toggles the viewability definition between visible and hidden for the at least one noncontiguous nonselected item.

6. The computer program product of claim 4, wherein the computer readable program code is configured to, in response to a determination that the selection creates at least one contiguous group of nonselected items, add a nonselected group marker in the graphical user interface for the at least one contiguous group of nonselected items, wherein selection of the nonselected group marker toggles the viewability definition between visible and hidden for the at least one contiguous group of nonselected items.

7. The computer program product of claim 4, wherein the computer readable program code is configured to, in response to a determination that the selection creates at least one noncontiguous selected item, add a selected individual marker in the graphical user interface for the at least one noncontiguous selected item, wherein selection of the selected individual marker toggles the viewability definition between visible and hidden for the at least one noncontiguous selected item.

8. The computer program product of claim 7, wherein the computer readable program code is configured to receive user input for the selected individual marker to modify the viewability definition of the at least one noncontiguous selected item.

9. The computer program product of claim 4, wherein a file navigation tool comprises the graphical user interface.

10. An apparatus comprising:

a processor; and an item management module executable on the processor and operable to, present items in a list of a graphical user interface in a first order on a display;

receive a selection of one or more of the items in the list, wherein the items in the list have a viewability definition, the viewability definition defining whether the items in the list are visible or hidden in the graphical user interface in the first order;

define the items in the list as selected or nonselected based on the selection of the one or more items in the list;

receive a request to reorder the items in the list in a second order that is different from the first order;

present the items in the list in the second order on the display, wherein the items in the list retain their viewability definition and still indicate being selected or nonselected from the graphical user interface in the first order during the presenting of the items in the list in the second order;

add markers in the graphical user interface for an item and any contiguous groups of items that are grouped together based on items being selected and nonselected, the markers being selectable to modify the viewability definition for the associated item or any contiguous groups of items, wherein one of the markers comprises a selected group marker that is associated with a contiguous group of selected items; and in response to receiving user input to select the selected group marker, change the viewability definition of the contiguous group of selected items from visible to hidden and remove the contiguous group of selected items from the graphical user interface.

11. The apparatus of claim 10, wherein the item management module is operable to receive user input relative to at least one of the markers to modify the viewability definition of the associated item or at least of the any contiguous groups of items.

12. The apparatus of claim 10, wherein one of the markers comprises a nonselected group marker that is associated with a contiguous group of nonselected items, wherein the item management module is operable to, in response to receiving user input to select the nonselected group marker, change the viewability definition of the contiguous group of nonselected items from visible to hidden; and remove the contiguous group of nonselected items from the graphical user interface.

13. The apparatus of claim 10, wherein one of the markers comprises a nonselected individual marker that is associated with a nonselected item, wherein the item management module is operable to, in response to receiving user input to select the nonselected individual marker, change the viewability definition of the nonselected item from visible to hidden; and remove the nonselected item from the graphical user interface.

14. The method of claim 10, wherein a file navigation tool comprises the graphical user interface.

\* \* \* \* \*